United States Patent [19]

Handley et al.

[11] Patent Number: 4,987,744
[45] Date of Patent: Jan. 29, 1991

[54] CRYOGENIC DISTILLATION WITH UNBALANCED HEAT PUMP

[75] Inventors: James R. Handley, Amherst; Ravindra F. Pahade, Getzville, both of N.Y.

[73] Assignee: Union Carbide Industrial Gases Technology Corporation, Danbury, Conn.

[21] Appl. No.: 470,715

[22] Filed: Jan. 26, 1990

[51] Int. Cl.$^5$ ............................................. F25J 3/02
[52] U.S. Cl. .............................................. 62/24; 62/40
[58] Field of Search ............................ 62/9, 11, 24, 40

[56] References Cited

U.S. PATENT DOCUMENTS

| | | | |
|---|---|---|---|
| 4,433,990 | 2/1984 | Olszewski | 62/22 |
| 4,501,600 | 2/1985 | Pahade | 62/28 |
| 4,504,295 | 3/1985 | Davis et al. | 62/40 |
| 4,592,767 | 6/1986 | Pahade et al. | 62/31 |
| 4,662,919 | 5/1987 | Davis | 62/40 |
| 4,778,498 | 10/1988 | Hanson et al. | 62/28 |

Primary Examiner—Ronald C. Capossela
Attorney, Agent, or Firm—Stanley Ktorides

[57] ABSTRACT

A cryogenic distillation system wherein a first heat exchange fluid transfers heat in part from a process stream to the bottom of a column, and in part from a process stream to a second heat exchange fluid and out of the system, thus generating net refrigeration.

21 Claims, 1 Drawing Sheet 4,987,744

CRYOGENIC DISTILLATION WITH UNBALANCED HEAT PUMP

TECHNICAL FIELD

This invention relates generally to cryogenic distillation and more particularly to heat exchange within the cryogenic distillation.

BACKGROUND ART

Cryogenic distillation can involve moderate subambient temperatures within the range of from about 20° F. to −100° F. for applications such as natural gas processing, and much lower subambient temperatures within the range of from about −280° F. to −320° F. for applications such as air separation. For each application, the feed is passed into a distillation column and separated by providing refrigeration for the top of the column and heat addition at the bottom of the column. Often the necessary refrigeration and heat addition for the column separation are provided by a recirculating heat exchange fluid or heat pump which extracts the heat at a low subambient temperature and adds the equivalent heat at a higher subambient temperature. Since heat leak into a cryogenic distillation plant will occur, and since refrigeration may be removed from the plant in the form of cryogenic liquid product, it is generally necessary to add net refrigeration to a cryogenic distillation plant in order to maintain operation. Refrigeration may be added, for example, by the addition of low temperature liquid or by the turboexpansion of a pressurized process stream.

The addition of refrigeration to a cryogenic distillation plant is costly. It is desirable to have a cryogenic distillation method which can operate without the need for added refrigeration from outside the system.

Accordingly it is an object of this invention to provide a cryogenic distillation method wherein refrigeration requirements are compensated for by internal generation with reduced need for added refrigeration from outside the system.

SUMMARY OF THE INVENTION

The above and other objects which will become apparent to one skilled in the art upon a reading of this disclosure are attained by the present invention which is:

A method for separating a multicomponent feed by cryogenic distillation comprising:

(A) providing feed having lighter and heavier components into a distillation column;

(B) separating the feed by cryogenic distillation in the column into a top vapor enriched in lighter component(s) and into a bottom liquid enriched in heavier component(s);

(C) heating a first heat exchange fluid by indirect heat exchange with a cooling process stream;

(D) warming the bottom liquid by indirect heat exchange with a first portion of the heated first heat exchange fluid;

(E) warming a second heat exchange fluid having a vapor pressure less than that of the first heat exchange fluid by indirect heat exchange with a second portion of the heated first heat exchange fluid;

(F) passing the cooled first and second portions resulting from steps (D) and (E) in indirect heat exchange with said process stream to carry out the heat exchange of step (C); and (G) cooling the second heat exchange fluid and passing the resulting cooled second heat exchange fluid in indirect heat exchange with the said second portion to carry out the heat exchange of step (E).

The term, "column", as used herein means a distillation of fractionation column or zone, i.e., a contacting column or zone wherein liquid and vapor phases are countercurrently contacted to effect separation of a fluid mixture, as for example, by contacting of the vapor and liquid phases on a series of vertically spaced trays or plates mounted within the column or alternatively on packing elements with which the column is filled. For a further discussion of distillation columns see the Chemical Engineers' Handbook, Fifth Edition, edited by R. H. Perry and C. H. Chilton, McGraw-Hill Book Company, New York, Section 13, "Distillation" B. D. Smith et al, page 13-3 *The Continuous Distillation Process.*

The term "indirect heat exchange", as used herein means the bringing of two fluid streams into heat exchange relation without any physical contact or intermixing of the fluids with each other.

As used herein, the terms "lighter" and "heavier" mean components with higher and lower vapor pressures respectively so that the components can be separated by processing within a distillation column.

As used herein, the term "heat exchange fluid" means any suitable fluid for performing the requisite heat exchange steps. Generally the fluid can be a hydrocarbon such as methane, ethane, propane and the like, or an atmospheric gas such as nitrogen, argon and the like, or a refrigerant fluid such as various halogenated hydrocarbons or mixtures thereof. The specific choice of fluid will depend on its vapor pressure characteristics.

DETAILED DESCRIPTION

Figure 1:
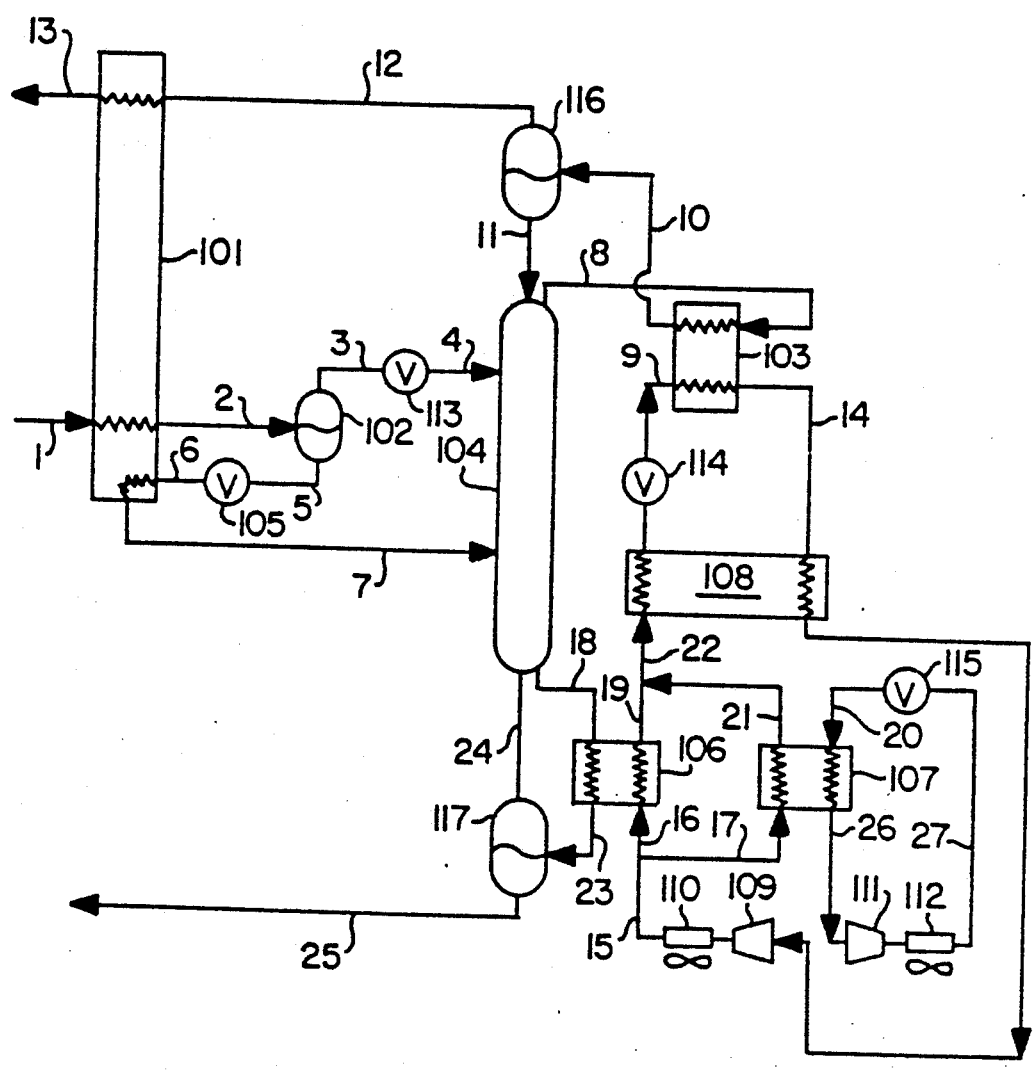
FIG. 1 is a schematic representation of one preferred embodiment of the method and apparatus of this invention wherein the cooling process stream is top vapor.

The invention will be described in detail with reference to the drawings. Referring now to FIG. 1, feed 1 is cooled by indirect heat exchange through heat exchanger 101 and resulting two-phase feed stream 2 is passed into phase separator 102. Vapor 3 from phase separator 102 is expanded through valve 113 and passed 4 into cryogenic distillation column 104. Liquid 5 from phase separator 102 is expanded through valve 105, passed as stream 6 partly through heat exchanger 101 and then passed 7 into cryogenic rectification column 104.

The feed is generally gaseous although it may be a mixed phase gas and liquid. The feed is comprised of at least one lighter component and at least one heavier component. Examples of such feeds include a natural gas feed comprising methane and carbon dioxide where methane is the lighter component and carbon dioxide is the heavier component, and air wherein nitrogen is the lighter component and oxygen is the heavier component. The pressure of a natural gas feed is generally within the range of from 500 to 1000 pounds per square inch absolute (psia) and the pressure of an air feed is generally within the range of from 20 to 300 psia.

Within column 104 the feed is separated by cryogenic distillation into a top vapor enriched in the lighter component(s), and into a bottom liquid enriched in the heavier component(s). Top vapor 8 is cooled and partially condensed by indirect heat exchange through heat exchanger 103 against recirculating first heat exchange fluid 9. Resulting two phase stream 10 is passed into phase separator 116 from which liquid 11 is passed into column 104 as liquid reflux, and from which vapor 12 is warmed by passage through heat exchanger 101 and removed 13 and, if desired, recovered as product.

As mentioned, the top vapor is cooled by indirect heat exchange with a first heat exchange fluid 9. Resulting heated and vaporized first heat exchange fluid 14 is then passed through heat exchanger 108, compressor 109 and cooler 110. The function of heat exchanger 108 is to subcool stream 22 so as to reduce the flashoff of vapor upon throttling through valve 114. This reduces the quantity of refrigerant that needs to be circulated by providing a refrigerant of greater quality to heat exchanger 103. The pressure of stream 14 is the dewpoint temperature of the refrigerant consistent with the temperature required by the overhead vapor product from phase separator 116. Compressor 109 compresses the heat exchange fluid to a pressure that ensures condensing of the heat exchange fluid when cooled in heat exchangers 106 and 107. Cooler 110 cools the compressed heat exchange fluid against suitable fluids such as air or water in order to remove heat added by the compression.

The resulting first heat exchange fluid 15 is divided into first portion 16 and second portion 17. First portion 16 is generally within the range of from 25 to 90 percent, and second portion 17 is generally within the range of from 10 to 75 percent, of first heat exchange fluid 15. First portion 16 is passed through heat exchanger 106 wherein it warms bottom liquid 18 by indirect heat exchange. Resulting cooled and condensed first portion 19 is then passed through heat exchanger 108 and valve 114 and back to heat exchanger 103. Second portion 17 is passed through heat exchanger 107. Within heat exchanger 107 second portion 17 warms and vaporizes recirculating second heat exchange fluid 20 by indirect heat exchange and the resulting cooled and condensed second portion 21 is passed back to heat exchanger 103. FIG. 1 illustrates a preferred arrangement wherein streams 21 and 19 are combined into stream 22 which is passed through heat exchanger 108 and valve 114 and then passed into heat exchanger 103 as stream 9. The cooled and condensed first and second portions of the first heat exchange fluid are passed through heat exchanger 103 to carry out the aforedescribed cooling of the top vapor.

Two phase stream 23 from heat exchanger 106 is passed into phase separator 117 from which vapor 24 is passed back into column 104 a vapor boilup, and from which liquid 25 is removed and, if desired, recovered as product or directly reemployed.

The second heat exchange fluid has a vapor pressure less than that of the first heat exchange fluid. One preferred heat exchange fluid arrangement has ethane as the first heat exchange fluid and propane as the second heat exchange fluid. Other heat exchange fluid arrangements include ethylene and propylene. Suitable freons may also be employed.

As mentioned, the second heat exchange fluid has a lower vapor pressure than the first heat exchange fluid. The difference in vapor pressure allows the first heat exchange fluid, when compressed, to be condensed against the boiling of the second heat exchange fluid. The second heat exchange fluid having a lower vapor pressure can be condensed at ambient temperature. Thus, the first heat exchange fluid can remove heat from a source at cryogenic temperature, and transfer this heat to the second heat exchange fluid. The second heat exchange fluid can transfer this heat to the ambient surroundings.

The resulting warmed second heat exchange fluid 26 is compressed by passage through compressor 111 and cooled by passage through cooler 112 against any suitable fluid, such as air or water, which serves to reject heat out of the system. The resulting cooled and condensed second heat exchange fluid 27 is then expanded through valve 115 and provided back to heat exchanger 107 wherein it is warmed and vaporized by indirect heat exchange with cooling and condensing second portion 17.

As mentioned, vapor is taken from the column system as vapor stream 13 and bottom liquid is taken from the column system as liquid stream 25. In the case where the feed is from an oil or gas reservoir which has been injected with carbon dioxide for secondary recovery and wherein the feed contains methane and carbon dioxide, stream 13 would be a product methane stream and stream 25 would be a liquid carbon dioxide stream which can be reused in the secondary recovery operation.

Figure 2:
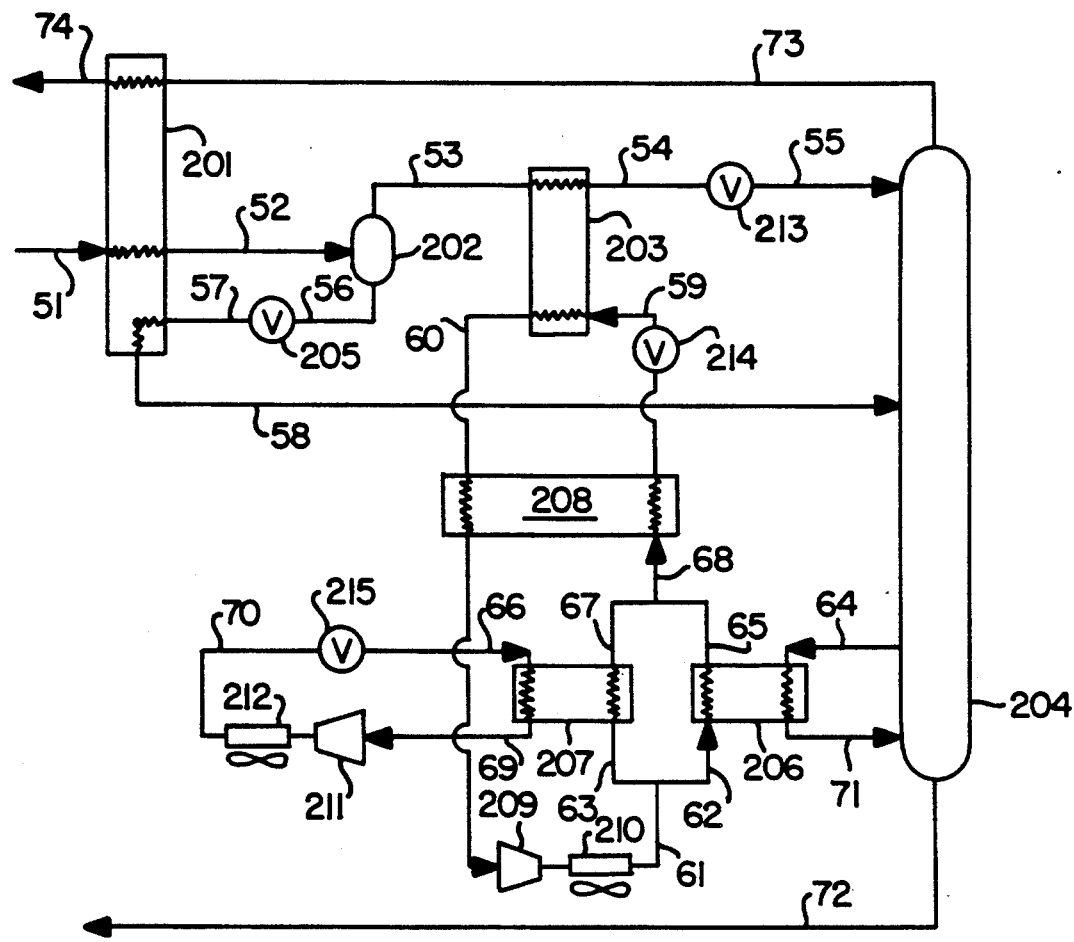
FIG. 2 is a schematic representation of another preferred embodiment of this invention wherein the cooling process stream is a feed stream.

FIG. 2 illustrates another embodiment of the process of this invention wherein the cooling process stream is a feed stream rather than top vapor from the column. Referring now to FIG. 2, feed 51 is cooled by indirect heat exchange through heat exchanger 201 and resulting two-phase feed stream 52 is passed into phase separator 202. Vapor 53 from phase separator 202 is cooled and partially condensed by passage through heat exchanger 203, resulting stream 54 is expanded through valve 213, and then is passed 55 into cryogenic distillation column 204. Liquid 56 from phase separator 202 is expanded through valve 205, passed as stream 57 partly through heat exchanger 201 and then passed 58 into cryogenic rectification column 204 wherein the feeds are separated by cryogenic distillation into a top vapor enriched in lighter component(s) and into a bottom liquid enriched in heavier component(s).

Feed stream 53 is cooled by indirect heat exchange through heat exchanger 203 against recirculating first heat exchange fluid 59. Resulting heated and vaporized first heat exchange fluid 60 is then passed through heat exchanger 208, compressor 209 and cooler 210 and the resulting first heat exchange fluid 61 is divided into first portion 62 and second portion 63. First portion 62 is passed through heat exchanger 206 wherein it warms bottom liquid 64 by indirect heat exchange. Resulting cooled and condensed first portion 65 is then passed through heat exchanger 208, wherein it is subcooled, throttled through valve 214 and passed back to heat exchanger 203. Second portion 63 is passed through heat exchanger 207. Within heat exchanger 207 second portion 63 warms and vaporizes recirculating second heat exchange fluid 66 by indirect heat exchange and the resulting cooled and condensed second portion 67 is passed back to heat exchanger 203. Preferably, as illustrated in FIG. 2, streams 65 and 67 are combined into stream 68 which is passed through heat exchanger 208 and valve 214 and then passed into heat exchanger 203 as stream 59. The cooled and condensed first and second portions of the first heat exchange fluid are passed through heat exchanger 203 to carry out the aforedescribed cooling of feed stream 53.

The resulting warmed and vaporized second heat exchange fluid 69 is compressed by passage through compressor 211 and cooled by passage through cooler 212 against any suitable fluid, such as air or water, which serves to reject heat out of the system and thus generate refrigeration. The resulting cooled and condensed second heat exchange fluid 70 is then expanded through valve 215 and provided back to heat exchanger 207 wherein it is warmed and vaporized by indirect heat exchange with cooling and condensing second portion 63.

Two-phase bottom liquid 71 emerging from heat exchanger 206 is passed into column 204 wherein the vapor serves as boilup for the cryogenic distillation. Liquid is removed from column 204 as stream 72 which, if desired, may be recovered or reused. Top vapor 73 is taken from column 204, warmed through heat exchanger 201, and resulting stream 74 may, if desired, be recovered as product.

The method of this invention enables the operation of a heat pump with a net generation of refrigeration at reduced energy requirements. A conventional heat pump transfers heat within a system but with no net heat change. With this invention comprising two separate heat exchange fluids, net refrigeration is generated thus reducing or eliminating the need to provide exogenous refrigeration to the system. Accordingly a gaseous feed may be provided to the system and both gas and liquid may be removed from the system without the need for exogenous refrigeration in the form of added liquid or turboexpansion.

Although the invention has been described in detail with referenced to two preferred embodiments, those skilled in the art will recognize that there are other embodiments of the invention within the spirit and scope of the claims.

We claim:

1. A method for separating a multicomponent feed by cryogenic distillation comprising:
   (A) providing feed having lighter and heavier components into a distillation column;
   (B) separating the feed by cryogenic distillation in the column into a top vapor enriched in lighter components(s) and into a bottom liquid enriched in heavier component(s);
   (C) heating a first heat exchange fluid by indirect heat exchange with a cooling process stream;
   (D) warming the bottom liquid by indirect heat exchange with a first portion of the heated first heat exchange fluid;
   (E) warming a second heat exchange fluid having a vapor pressure less than that of the first heat exchange fluid by indirect heat exchange with a second portion of the heated first heat exchange fluid;
   (F) passing the cooled first and second portions resulting from steps (D) and (E) in indirect heat exchange with said process stream to carry out the heat exchange of step (C); and
   (G) cooling the second heat exchange fluid and passing the resulting cooled second heat exchange fluid in indirect heat exchange with the said second portion to carry out the heat exchange of step (E).

2. The method of claim 1 wherein the said cooling process stream is top vapor.

3. The method of claim 2 wherein the cooling top vapor is partially condensed, resulting liquid is passed down the column as reflux, and resulting vapor is removed.

4. The method of claim 1 wherein the said cooling process stream is feed.

5. The method of claim 4 wherein a feed stream is divided in vapor and liquid streams and the resulting vapor feed serves as the cooling process stream.

6. The method of claim 4 wherein the cooling feed is partially condensed.

7. The method of claim 1 wherein the warming bottom liquid is partially vaporized, resulting vapor is passed up the column as boilup, and resulting liquid is removed.

8. The method of claim 1 wherein the feed comprises methane as a lighter component and carbon dioxide as a heavier component.

9. The method of claim 1 wherein the first heat exchange fluid comprises ethane and the second heat exchange fluid comprises propane.

10. The method of claim 1 wherein the first portion comprises from 25 to 90 percent, and the second portion comprises from 10 to 75 percent, of the heated first heat exchange fluid.

11. The method of claim 1 wherein the second heat exchange fluid in cooled by heat exchange with air.

12. The method of claim 1 wherein the second heat exchange fluid is cooled by heat exchange with water.

13. The method of claim 1 wherein the cooled first and second portions are combined and are passed together in indirect heat exchange with the cooling process stream.

14. The method of claim 1 wherein the second heat exchange fluid is compressed prior to the cooling of step (G) and expanded prior to the warming of step (E).

15. The method of claim 1 wherein in step (C) the first heat exchange fluid is vaporized by the heat exchange with the process stream.

16. The method of claim 1 wherein in step (D) the first portion of the first heat exchange fluid is condensed by the heat exchange with the bottom liquid.

17. The method of claim 1 wherein in step (E) the second portion of the first heat exchange fluid is condensed by the heat exchange with the second heat exchange fluid.

18. The method of claim 1 wherein after step (C) but prior to steps (D) and (E) the first heat exchange fluid is compressed.

19. The method of claim 18 wherein the first heat exchange fluid is cooled after the compression.

20. The method of claim 1 wherein the second heat exchange fluid is condensed by the cooling of step (G).

21. The method of claim 1 wherein the feed is taken from an oil or gas reservoir.

* * * * *

UNITED STATES PATENT AND TRADEMARK OFFICE
CERTIFICATE OF CORRECTION

PATENT NO. : 4,987,744

DATED : January 29, 1991

INVENTOR(S) : James R. Handley et al

It is certified that error appears in the above-identified patent and that said Letters Patent is hereby corrected as shown below:

In column 3, line 56 delete "a" and insert therefor --as--.

In claim 5, line 2 delete "in" and insert therefor --into--.

Signed and Sealed this

Second Day of June, 1992

Attest:

DOUGLAS B. COMER

*Attesting Officer*  *Acting Commissioner of Patents and Trademarks*